United States Patent [19]

Vargas

[11] 4,366,940
[45] Jan. 4, 1983

[54] SURVEY TRIPOD

[76] Inventor: Roderick Vargas, 2748 Mansfield Dr., Burbank, Calif. 91504

[21] Appl. No.: 194,704

[22] Filed: Oct. 6, 1980

[51] Int. Cl.³ .................... F16M 13/00; F16M 11/38
[52] U.S. Cl. .................................... 248/542; 248/170
[58] Field of Search .............. 248/542, 168, 169, 170, 248/171, 167, 188.6, 188.7, 414

[56] References Cited

U.S. PATENT DOCUMENTS

| | | | |
|---|---|---|---|
| 1,646,064 | 10/1927 | Obermeyer | 248/156 |
| 2,588,399 | 3/1952 | McQuin | 182/20 |
| 2,687,866 | 8/1954 | Johnson | 248/168 |
| 3,153,123 | 10/1964 | Harman | 248/414 X |
| 3,235,215 | 2/1966 | Lodde | 248/170 X |
| 3,309,049 | 3/1967 | Albee | 248/188.6 X |
| 3,685,162 | 8/1972 | Haun | 248/170 X |
| 3,762,269 | 10/1973 | Rusbach | 248/170 X |
| 3,838,838 | 10/1974 | Seaman | 248/188.7 X |

FOREIGN PATENT DOCUMENTS 944564 12/1963 United Kingdom ................ 248/168

Primary Examiner—J. Franklin Foss
Attorney, Agent, or Firm—Warren T. Jessup; Richard D. Slehofer

[57] ABSTRACT

A survey tripod for use in uneven terrain which includes a center pole and a pair of support legs, each leg is pivotally attached to a slideable clamp on the upper part of the pole for vertical adjustment of each leg. The lower end of each leg is connected to the pole with a brace, both ends of each brace having pivotal connections for adjustment of the legs. There is a clamp connecting both braces to the lower part of the pole which permits anchoring the brace, and permits additional vertical adjustment of the legs relative to the center pole. A telescopic tube within the pole can be extended upwardly to increase the effective height of the pole. A survey instrument can be attached to the tip of the telescopic tube.

4 Claims, 14 Drawing Figures

U.S. Patent  Jan. 4, 1983  Sheet 1 of 3  4,366,940
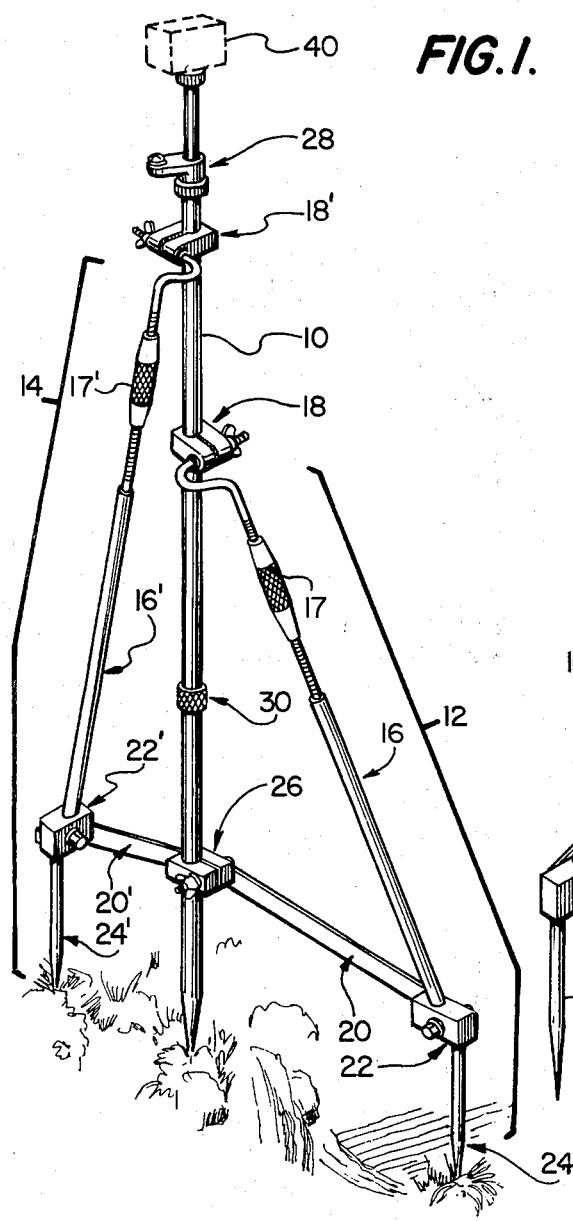
FIG.1.
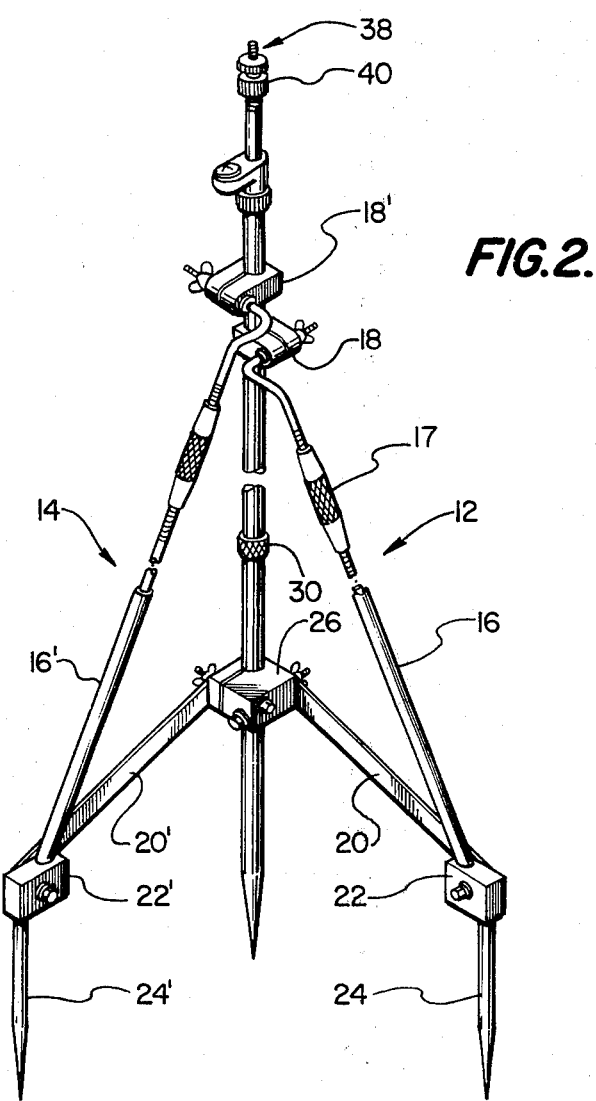
FIG.2.
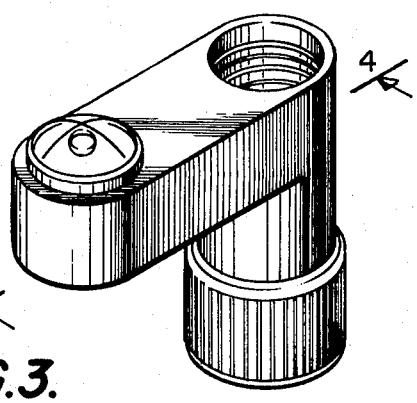
FIG.3.
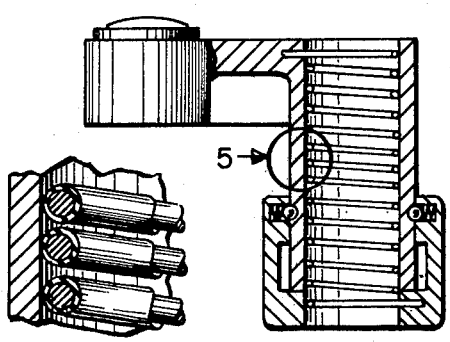
FIG.4.
FIG.5.

U.S. Patent  Jan. 4, 1983  Sheet 2 of 3  4,366,940
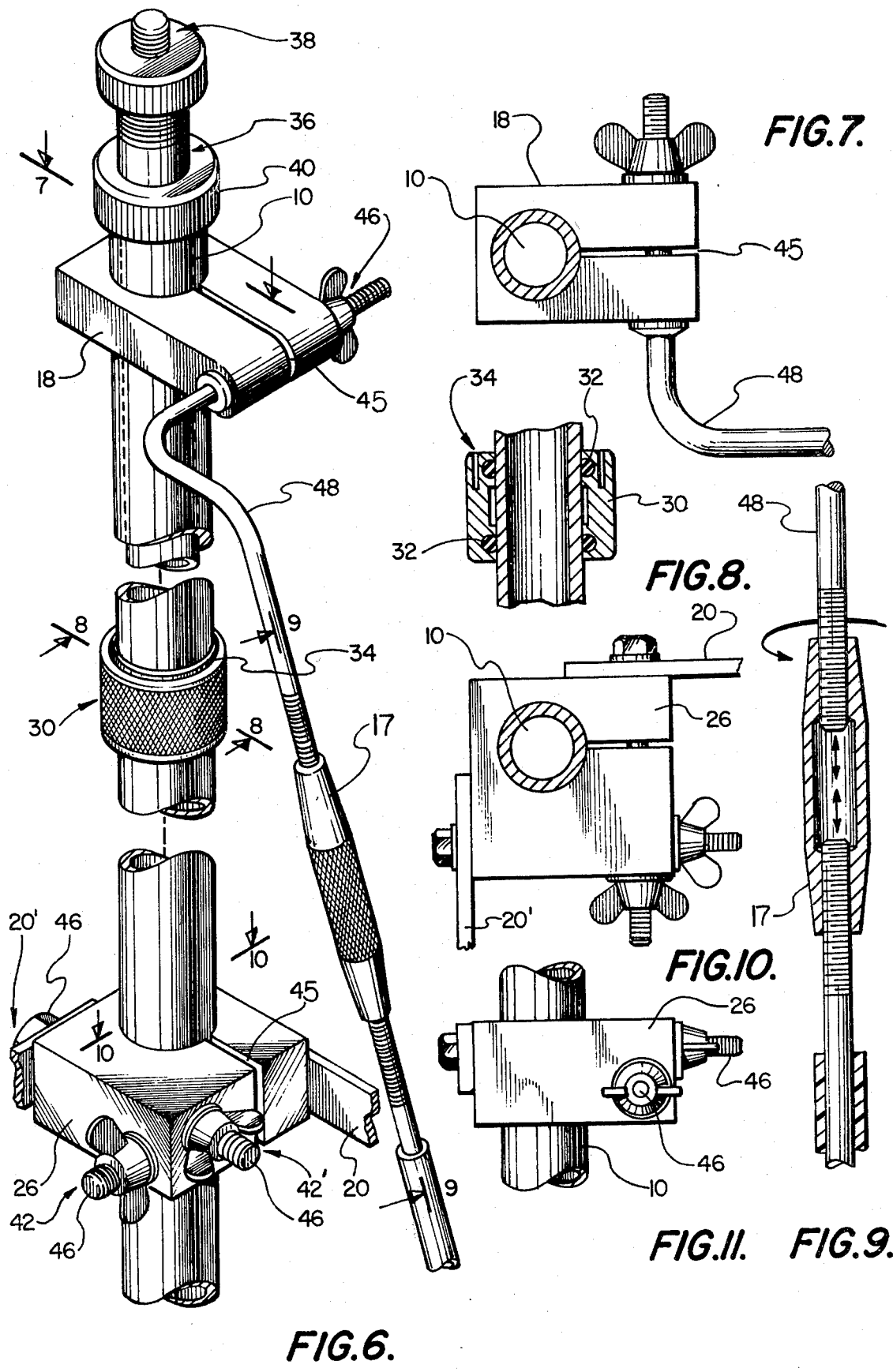

SURVEY TRIPOD

BACKGROUND OF THE INVENTION

For surveying purposes, the instrument mounted atop the tripod must be precisely placed directly above a particular point on a ground surface. In the past, the method of locating the instrument above the particular point was accomplished in one of two ways:

(1) a single pole with a point at one end was pushed into the ground by the surveyor at the predetermined point chosen. The pole was thereafter held in the vertical position by the assistant, who relied on a bubble level to indicate to him that the pole was in a correct vertical attitude. This method tends to introduce error into surveying, because the vertical attitude of the survey pole cannot be precisely maintained. It also wastes valuable manhours whenever the survey is extensive. One person has to stay with the pole to keep it erect and aligned. Ideally the instrument or other object attached to the top of the pole will be directly above the predetermined point.

(2) the other method for locating the instrument above the predetermined point involved a tripod and a plumbline. The plumb and line are hung from the correct point on the apex of the tripod. The tripod is thereafter adjusted and moved around until the tip of the plumb is directly above the predetermined point.

SUMMARY OF THE INVENTION

The purpose of this invention is to provide a survey tripod which can be placed over a predetermined point on any kind of terrain, without the need of an assistant staying with the pole, and which eliminates the necessity of using a plumbline to find the correct position of the tripod above the predetermined point.

The present invention is a survey tripod having two legs and a center pole. The center pole has to be aligned in a vertical attitude and then held stationary in that position by the legs until the surveying job is completed. A telescopic tube is contained within the pole and can be extended out of the pole and kept at a variable height by turning a compression clamp at the upper end of the tube, to release the tube. The upper end of the tube terminates with a ⅝" thread which is the standard size in surveying. A variety of instruments can therefore be used with this invention. The purpose of the telescopic tube is to increase the overall height of the tripod. Height is important in surveying over rough terrain or long distances. This increases the versatility of the invention.

The pole is maintained in its vertical attitude by a first and second supports means hereinafter referred to as legs. Both legs are generally of the same configuration and perform the same function, which is to help support the pole.

Each leg is comprised of a diagonal rod and lateral brace which is combined to form a generally triangular shape with the pole, the pole and lateral brace comprising the shorter sides of the triangle, and the rod comprising the longest side.

Each vertex of this triangle configuration contains a pivotal connection such that both the rod and brace can alter their angular attitude relative to the pole. Each rod is attached to the pole at its upper end by means of a slider. Both sliders are mounted one above the other, and can be slid up and down on the pole independently of each other. The rod is divided into two sections where the pivotal connection and the lateral brace make contact. The upper section, as stated, is diagonally located relative to the pole, while the lower section is parallel to the pole and provides the point which contacts the ground. The lateral braces of both legs are attached to the pole at its lower end by means of a clamp. The clamp can also be moved vertically on the pole. By adjusting the position of the sliders and the clamp on the pole, the legs can be independently positioned to support the pole in a vertical position, which is useful when the ground has an uneven surface. The pivotal connections contain wing nut and bolt assemblies to secure the sliders and clamps in the correct position on the pole. A bubble level is attached to the pole to assist the operator to align the pole in the vertical array. Fine tuning to finalize the vertical attitude of the pole is required for exacting work such as found in surveying. A turnbuckle is integrated within the diagonal rod. The sleeve of the turnbuckle can be turned to either increase or decrease the effective length of each leg which will cause the vertical attitude of the pole to shift. By correct adjustment of these turnbuckles and referring to the level bubble, the true vertical attitude of the pole can be established. Weights can be incorporated with or added to the diagonal rod—lateral brace pivotal connection to give the device greater stability when erect and positioned for use.

The device can function as a layout pole. By raising both legs, taking a line, releasing the legs, and thereafter aligning the vertical attitude by means of the clamps and turnbuckles.

The device functions as a tripod by setting it up over a known point such as a well monument and affixing a surveying instrument to the upper end of the tube. A calibrated sleeve is on the pole to hold an end of a tape measure, while a surveyor measures a given distance from the pole.

BRIEF DESCRIPTION OF THE DRAWINGS

FIG. 1 is a perspective view of the tripod positioned for use in the area of rough terrain.

FIG. 2 is a perspective view of the tripod positioned for use on a flat surface.

FIG. 3 is a perspective view of the bubble level and housing which is slideably attached to the pole.

FIG. 4 is a longitudinal sectional view substantially along the line 4—4 of FIG. 3.

FIG. 5 is a fragmentary sectional view generally within the circle 5, as shown in FIG. 4.

FIG. 6 is an enlarged fragmentary perspective view of the tripod, showing the slider and pivotal connections of the tripod.

FIG. 7 is a top plan view of the slider along the line 7—7 of FIG. 6.

FIG. 8 is a longitudinal sectional view of the circular sleeve along the line 8—8 of FIG. 6.

FIG. 9 is a longitudinal sectional view of the turn buckle taken along the line 9—9 of FIG. 6.

FIG. 10 is a top plan view of the clamp taken along line 10—10 of FIG. 6.

FIG. 11 is an elevational view of the clamp taken along the line 11—11 of FIG. 6.

DETAILED DESCRIPTION OF THE PREFERRED EMBODIMENT

Figure 12:
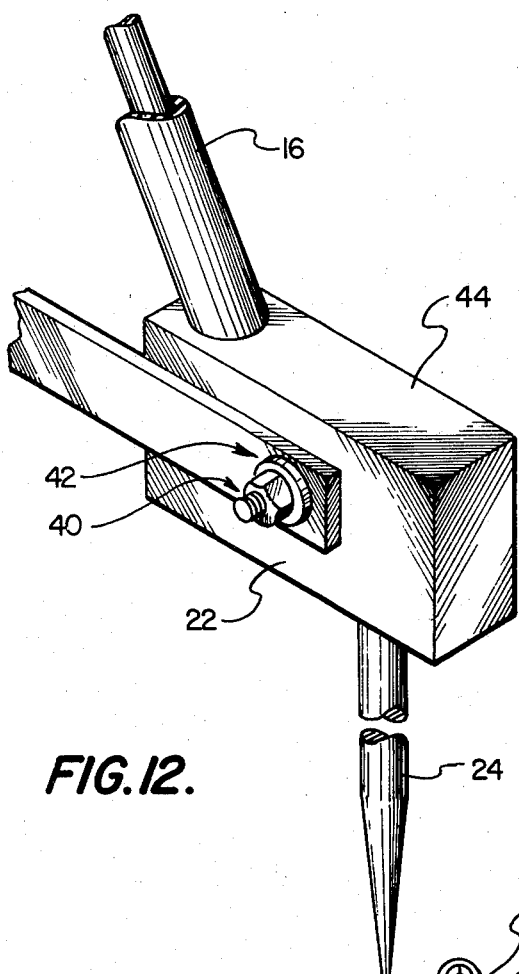
FIG. 12 is a fragmentary plan view of the pivotal connection between the outer end of the brace and the rod.

Referring to FIG. 1, there is shown generally a pole 10 adapted to be supported in a vertical position when held in that mode by two support means generally designated as 12 and 14. Each support means or leg is comprised of the following: a generally diagonal rod 16 which is connected to the upper part of the rod by means of a slider 18. The lower portion of the diagonal rod is connected to a lateral brace 20 with the lower outer end of the diagonal rod and the outer end of the brace 20 coming together with a pivotal connection generally designated 22. The diagonal rod 12 proceeds to extend beyond this pivotal connection and ends with a generally perpendicular portion 24 for adaptability to be embedded in the ground or upon it. The other support means 14 is also generally designated by a diagonal rod 16′, a pivotal connection 22′, a brace 20′, and a slider 18′. Each slider 18 and 18′ is movable up and down on the pole 10. A lower clamp 26 is also movable up and down on the pole 10. The purpose of these two sliders 18, 18′ and clamp 26 is to adjust the end portions 24 and 24′ of the legs, such that the pole 10 can be maintained in a vertical position over any type of irregular terrain or ground. The sliders 18 and 18′ and clamp 26 are preferably composed of a plastic material which has a low drag coefficient and which is sufficiently pliant to be compressed to firmly grasp the pole 10. The rod 16, which, as stated, runs between the slider 18 and the outer pivotal connection 22, contains a turnbuckle 17. The purpose of the turnbuckle is for fine adjustment of the vertical attitude of the pole 10. The tripod also includes a bubble level 28, as illustrated in FIGS. 3, 4 and 5. The bubble level 28 is slideable vertically on the pole 10. It is generally placed near the top of the pole 10 with the expectation that the person of average height would tend to see this bubble level at eye level; otherwise, there are no limitations placed upon the location of the bubble level. The purpose of the bubble level 28 is to indicate to the surveyor or operator of the device the correct vertical attitude of the pole 10. The bubble level 28 is of a standard type which contains an air bubble underneath an inverted watch glass containing a cross hairs.

When the bubble is centered with the cross hairs, the pole is in the vertical position.

The pole also comprises, or has included, a circular sleeve 30, shown in FIG. 8. The sleeve is placed about midway between the ends of the pole 10. This circular sleeve 30 is vertically slideable on the pole 10 and contains one or two O-rings to prevent the sleeve from slipping on the pole after it has been placed at the desired height on the pole.

The top of the sleeve contains a circular groove, which has a radius of exactly 0.05′ (five hundredths) of a foot. The end lip of a tape measure can be secured in the groove while the desired distance is stepped off by the surveyor. The 0.05′ of a foot is a common multiple used in surveying. 0.05′ must be added to the measurement because the pole contains an axis which is placed in the ground at the exact point where the surveyor is measuring from. The 0.05′ must compensate for the fact that the measurement is not taken from the axis of the pole.

The primary advantage of this new tripod is that it can be placed or positioned on diverse types of irregular terrain. Normally, tripods have three equal length legs and have very limited means for adjusting the tripod legs. A surveyor requires that his instrument or point of reference be vertically aligned relative to his reference point on the ground. He places the point of the pole 10 directly into the ground and loosens the two sliders 18 and 18′ such that the legs are free to slide up and down. A rough approximation of the vertical attitude of the pole with the aid of the bubble level is determined. Thereafter he securely tightens both sliders 18 and 18′ such that they are firmly held onto the pole and allowing the legs to freely support the erect pole 10. The terminal portions of the legs 12, 14 are touching the ground while the pole 10 is touching the ground. This is a three-point arrangement and is stable for the pole 10. The surveyor thereafter needs to finely adjust the vertical attitude of the pole 10. He does this by turning one or both of the turnbuckles 17, 17′. By observing the bubble level 28, he fine tunes until the bubble level 28 indicates to him that the pole 10 is in a vertical attitude.

The primary reason for allowing the clamp 26 to be slideable up and down on the pole 10 is to give the pole 10 the capacity to be positioned on a spot which is below ground level and where the legs 12, 14 will be positioned at ground level.

It is a common practice in surveying to bury various prior reference points which are called well marks. The surveyor must locate these marks with a metal detector, uncover the overlying dirt, and position the pole on the cross hair on the mark itself. The well marks are buried up to a foot below the surface. The pole 10 can be placed in the well mark hole after the clamp 26 and sliders 18 and 18′ have been loosened. The pole can thereafter be aligned in the usual manner. However, it is within the scope of this invention that the clamp 26 or means of attachment to the pole 10 by the lateral braces 20 and 20′ be immovably secured to the pole 10.

The pole 10 contains within it a telescopic tube 36 which has on its upper tip a $\frac{5}{8} \times 11$ type thread 38. This is a standard connection used in surveying equipment. The end of this telescopic tube 36 can be attached to any type of surveying instrument 40, such as a prism, a reflecting laser, a light-emitting device, and the like. The extension can be extended up to five feet above the tip of the pole 10. This allows for roughly ten feet above the ground and a greater distance from the other person who will be relying on this pole for sighting purposes. The extension can be tightened at any length between the top of the pole 10 up to the maximum height of the tube by means of a clamping nut 40 on the upper end of the pole.

Figure 14:
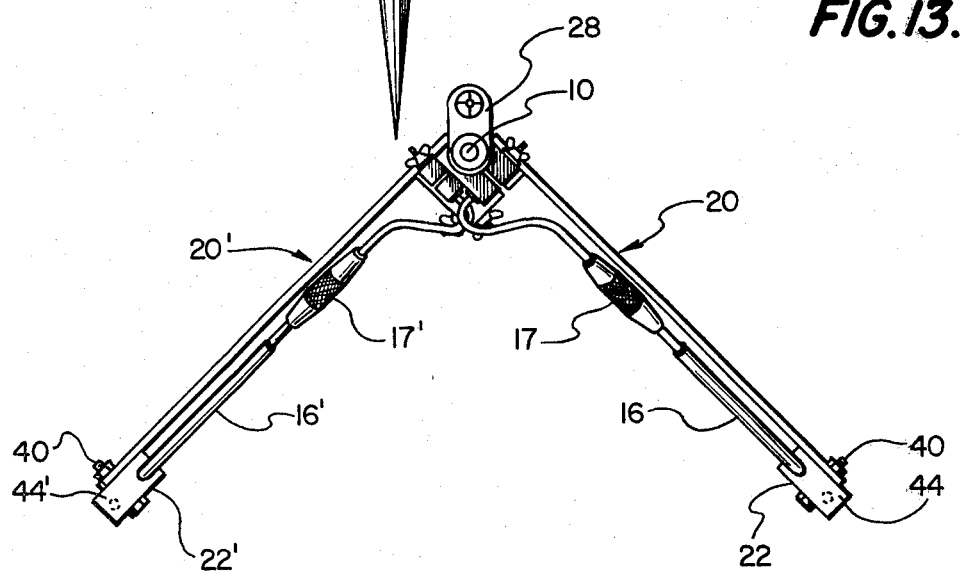
FIG. 14 is a top plan view of the tripod.

As illustrated in FIG. 12 and FIG. 14, the outer end of the brace 20 and the lower end of the diagonal rod 16 connect with a pivotal connection 22. This allows the diagonal rod 16 to move up and down when the positioning of the pole 10 is in progress. The end 24 of the diagonal rod 16, after it passes by the outer pivotal connection 22, terminates with a perpendicular portion 24. The pivotal connection contains a bolt and nut 40 with several washers 42, such that it will retain its pivotal ability and is not to be tightened firmly. It is unnecessary to the invention to have this tight. It is foreseeable and contemplated that this could be tightened down to provide a more rigid framework to stabilize the pole 10.

The pivotal connection, generally designated as 22 and 22′, uses the block 44 as the hub for the diagonal rod 16, lateral brace 20, and vertical portion 24, or spike, to communicate with each other. The block 44 is machined from a heavy material, such as steel, to provide weight to both of these pivotal connections 22 and 22′. Additional weights could be hung on the lateral bar 20 and 20′. Sufficient weight in these outer pivotal connections 22 and 22′ is necessary for the upright stability of the pole 10, especially while being used in gusting winds. The weight in these connections lowers the center of gravity appreciably. It was experimentally determined that each block 44, 44′ weighing four pounds apiece would solve the stability problem. The overall weight of the device is less than ten pounds, which is an acceptable weight for a surveyor's tripod which at times has to be carried long distances.

Each slider 18 and 18′ and clamp 20 can be fabricated from any type of rigid material, but which is sufficiently pliant to be compressed by the wing-and-bolt assemblies 42. It has been found that a plastic, such as polypropylethylene or Teflon is satisfactory for the purpose. They have a low drag coefficient to prevent binding and scratching to the pole, and the plastic material is lightweight and easy to machine. The slider 18, 18′ has a circular hole generally the size and diameter of the pole 10, such that it can be slid up and down on pole 10 without binding. The purpose of the slit 45 in the slider is to provide a clearance. The diameter of the hole can be reduced when the wing nut 46, which is at the upper end of the diagonal rod 16, is tightened down to securely grasp pole 10 and thereby keep the diagonal rod 16 at its position. As illustrated in FIGS. 7 and 8, the upper end of the diagonal rod 16 is generally an L-shaped configuration which enters through a hole in the slider 18, which is drilled at a right angle to the slit 45. The other end of 48 terminates at the turnbuckle 17. The turnbuckle is such that when it is rotated in a clockwise manner, it will tend to reduce the distance between the slider 18 and the external pivotal connection 22. When rotated counterclockwise, the turnbuckle will lengthen the distance between the slider 18 and the outer pivotal connection 22.

In this manner, the vertical attitude of the pole 10 can be adjusted. The main difference in the second leg 14 lies in the fact that it has a diagonal rod 16′ of somewhat longer length. The purpose of having one support or leg means 14 longer than support means 12 is to allow the slider 18′ to be placed above the slider 18. This allows the adjustment of the legs 12, 14 independently of each other, as illustrated in FIGS. 10 and 11.

Referring now to the clamp 26, one clamp is provided on the lower portion of the pole to function as a securing platform to hold the pivotal connections 22 between the inner end of the lateral braces 20, 20′ and the pole 10. The clamp 26 is generally fabricated like the slider is; that is, it is a square block with a hole drilled generally within the center of a diameter slightly larger than the diameter of the pole and a slit 45 extending radially out from the diameter to provide some tolerance until the clamp 26 is tightened to provide a secure fit around the pole 10. The clamp further consists of two holes drilled inside of and parallel to an edge at right angles to one another. The holes must be offset such that these two bolt assemblies 42, 42′, which will hold the braces 20, 20′ to form the pivotal connection 22, will not interfere with each other. The bolt 46 runs through one end of the brace 20 and then through the clamp 26 and fastens with a wing nut. Both braces are of this construction. The horizontal brace 20, 20′ extends laterally and is preferably of a rigid metal. The outer end of the brace 20, 20′ terminates with the outer connection of the diagonal rod 16 with a pivotal connection 22.

Figure 13:
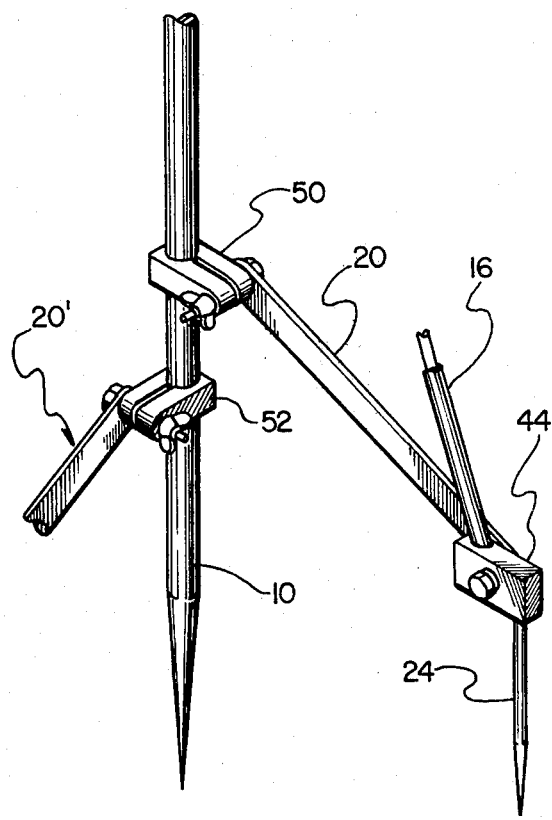
FIG. 13 is a plan view of two clamps as another embodiment of the invention.

This invention is not so limited to one clamp 26. As illustrated in FIG. 13, another embodiment of this invention has two clamps 50, 52, one for each brace 20, 20′. Of course the clamps 50, 52 would be placed one above the other, just like the two sliders 18, 18′ are. In this embodiment the two legs 12, 14 could be of the same length because they would be simply placed one above the other, one towards the bottom of the pole and one above the other towards the top of the pole 10. The only variation involved here would probably be vertical portions 24, 24′ or the spikes, which would have to be of unequal lengths.

The versatility of the tripod is improved by the two separate clamps, because the support means can be rotated about the pole 10 to change the angle the braces 20, 20′ create with the pole 10, as disclosed in FIG. 14. FIG. 14 shows the single clamp in a standard embodiment with both braces connected thereto forming an angle of 90°. This angle could be of something other than 90° just by the mere expediency of rotating either leg of the second embodiment. It has been experimentally shown that the 90° angle separation of the support legs 12, 14, relative to the pole 10, makes for the most stable arrangement when the tripod is in position for use by a surveyor.

Referring back now to FIG. 13, however, the configuration of two separate clamps 50, 52 allows the tripod to be adaptable over very difficult terrain; the diagonal support means 12, 14 could be rotated about the axis of the pole 10 to give it greater versatility in aligning the pole 10.

The pole 10 could be comprised of any rigid material, such as aluminum, polyglas, fiberglas, and is preferably painted in the gold and yellow markings which are of equal lengths, to enable the person sighting the rod to quickly focus on the pole 10 from any of the backdrops from which it is erected. The dual or multi-color markings are convenient because they distinguish from a backdrop which is similar to one of the colored markings. The contrasting color marking will aid the sighter in focusing on the pole 10.

Obviously, many modifications and variations are possible in light of the above teachings. It is therefore to be understood that the full scope of the invention is not limited to the details disclosed herein and may be practiced otherwise than as specifically described.

What is claimed is:
1. A tripod comprising:
a pole adapted to be ground supported in a vertical attitude;
first and second support means for supporting said pole, each said support means comprising:
a brace;
a generally diagonal rod having two portions, the portion between said pole and said brace being diagonal with respect to said pole, the portion below said brace being substantially vertical and adapted to be ground supported;
a slider slideably mounted for vertical movement along said pole;
a pivotal connection between the upper end of said rod and said slider;
a pivotal connection between the outer end of said brace and said rod;

a pivotal connection between the inner end of said brace and said pole and vertically adjustable along said pole;

a turnbuckle for adjusting the length of said rod;

a level bubble for levelling said pole;

a circular sleeve having at least one O-ring for securing the end of a tape measure to said pole and being vertically adjustable along said pole; and weights placed adjacent to said pivotal connection between the outer end of said brace and said rod for stabilizing said pole.

2. The tripod as recited in claim 1 wherein said pivotal connection between the inner end of said brace and said pole includes a first and second clamp, each said clamp slideable on said pole and attached by a pivotal connection to the inner end of said first brace and said second brace respectively.

3. A tripod comprising:

a pole adapted to be ground supported in a vertical attitude;

first and second support means for supporting said pole, each said support means comprising:

a brace;

a generally diagonal rod having two portions, the portion between said pole and said brace being diagonal with respect to said pole, the portion below said brace being substantially vertical and adapted to be ground supported;

a slider slideably mounted for vertical movement along said pole;

a pivotal connection between the upper end of said rod and said slider;

a pivotal connection between the outer end of said brace and said rod;

a pivotal connection between the inner end of said brace and said pole, said connection may be adjusted vertically along said pole;

a turnbuckle for adjusting the length of said rod;

a level bubble for levelling said pole; and weights placed adjacent to said pivotal connection between the outer end of said brace and said rod for stabilizing said pole.

4. The tripod as recited in claim 1 wherein said pivotal connection between the inner end of said brace and said pole includes a first and second clamp, each said clamp slideable on said pole and attached by a pivotal connection to the inner end of said first brace and said second brace respectively.

* * * * *